(12) United States Patent
Pham et al.

(10) Patent No.: US 9,229,893 B1
(45) Date of Patent: Jan. 5, 2016

(54) SYSTEMS AND METHODS FOR MANAGING DIRECT MEMORY ACCESS OPERATIONS

(71) Applicant: QLOGIC, Corporation, Aliso Viejo, CA (US)

(72) Inventors: Chuong HoangMinh Pham, Fountain Valley, CA (US); Dharma R. Konda, Aliso Viejo, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 0 days.

(21) Appl. No.: 14/264,957

(22) Filed: Apr. 29, 2014

(51) Int. Cl.
*G06F 13/28* (2006.01)

(52) U.S. Cl.
CPC ..................................... *G06F 13/28* (2013.01)

(58) Field of Classification Search
None
See application file for complete search history.

(56) References Cited

U.S. PATENT DOCUMENTS

| | | | |
|---|---|---|---|
| 8,271,700 B1* | 9/2012 | Annem et al. ................... | 710/26 |
| 2001/0001867 A1* | 5/2001 | Collier ..................... | G06F 13/28 |
| | | | 710/33 |
| 2005/0207407 A1* | 9/2005 | Baumberger .......... | H04L 49/90 |
| | | | 370/389 |
| 2013/0010198 A1* | 1/2013 | Chitnis ................. | H04N 5/268 |
| | | | 348/660 |

* cited by examiner

*Primary Examiner* — Ilwoo Park
(74) *Attorney, Agent, or Firm* — Klein, O'Neill & Singh, LLP

(57) ABSTRACT

Methods and systems for DMA operations are provided. A plurality of control blocks are stored at a memory of a receive module of a device coupled to a computing device, where the control blocks store information regarding data packets stored at a receive buffer accessible to the receive module. At least a first control block and a second control block are retrieved from the memory; and a first DMA register set is assigned to the first control block and a second DMA register set is assigned to the second control block. The first control block and the second control block are simultaneously pre-processed to configure the first DMA register set and the second DMA register set.

21 Claims, 7 Drawing Sheets

SYSTEMS AND METHODS FOR MANAGING DIRECT MEMORY ACCESS OPERATIONS

TECHNICAL FIELD

The present invention relates to computing systems and more particularly to managing direct memory access (DMA) operations.

RELATED ART

Computing systems use adapters for sending and receiving information to and from other network devices and storage devices. Various protocols and standards are used for such communication.

Adapters typically send information to a computing system processor using DMA operations. Adapters continue to become efficient and are expected to process DMA requests quickly. In conventional systems, a control block is typically used to setup a DMA operation. The control block may include various DMA requests and the number of DMA requests may vary from one control block to another. The control blocks are pre-processed and then the DMA operations are executed. Pre-processing control blocks consume computing resources and may cause delay in overall DMA operation execution.

To maintain in-order delivery of information to the computing system, control blocks are typically pre-processed serially i.e. control block 1 is pre-processed first and then a subsequent control block 2 is pre-processed. This can delay over-all delivery of information to the computing system and hence is undesirable. Continuous efforts are being made to improve adapter performance and delivery of information to the computing system.

BRIEF DESCRIPTION OF THE DRAWINGS

The various embodiments of the present systems and methods will now be discussed in detail with an emphasis on highlighting the advantageous features. These embodiments depict the novel and non-obvious systems and methods shown in the accompanying drawings, which are for illustrative purposes only. These drawings include the following figures, in which like numerals indicate like parts.

DETAILED DESCRIPTION

Figure 1A:
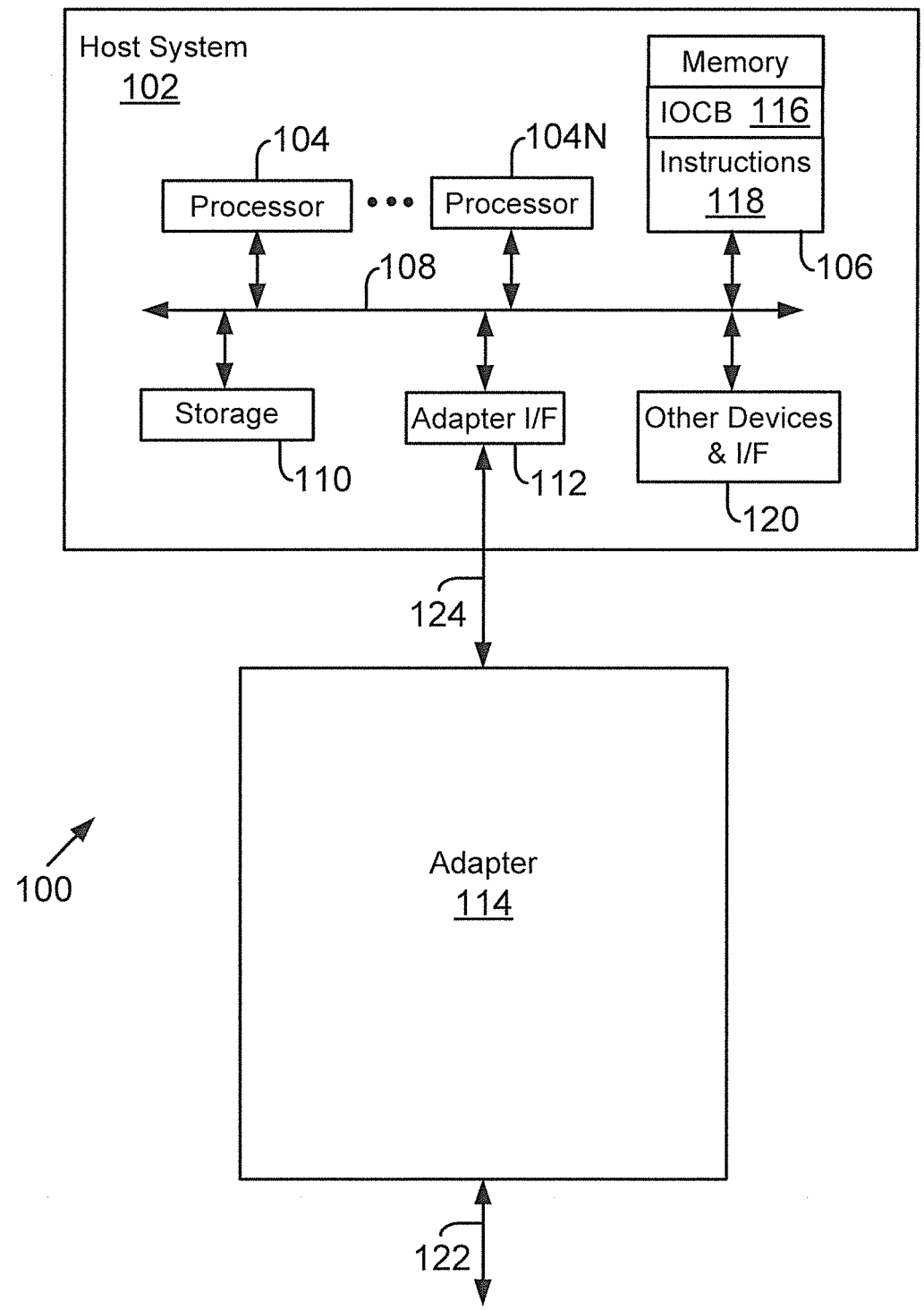
FIG. 1A is a block diagram of a typical host system.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer" "system," and "functionality" represent executable instructions that perform specified tasks when executed on a hardware based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein are implemented as a computer process (method), a computing system, or as an article of manufacture, such as a computer program product or computer-readable media. The computer program product may be non-transitory, computer storage media, readable by a computer device, and encoding a computer program of instructions for executing a computer process. The computer program product may also be readable by a computing system, and encoding a computer program of instructions for executing a computer process.

System 100:

FIG. 1A is a block diagram of a system 100, according to one embodiment. Certain standard and well-known components, which are not germane to the present invention are not shown in FIG. 1A. In one embodiment, system 100 includes a computing system 102 (also referred to as a host system 102) that communicates with other devices via adapter 114 and a network link 122. Host system 100 includes one or more processors 104 (shown as 104A-104N) and a memory 106, both of which are coupled to a connection system (also referred to as a bus system) 108. The bus system 108 is an abstraction that represents any one or more separate physical buses and/or point-to-point connections, connected by appropriate bridges, adapters and/or controllers. The bus system 108, therefore, may include, for example, a system bus, a Peripheral Component Interconnect (PCI) bus, a Hyper-Transport or industry standard architecture (ISA) bus, a SCSI (Small Computer Systems Interface) bus, a universal serial bus (USB), or an Institute of Electrical and Electronics Engineers (IEEE) standard 1394 bus (sometimes referred to as "Firewire").

Processor 104 is the central processing unit (CPU) of the processing system 100 and, thus, controls its overall operation. In certain embodiments, processor 104 accomplishes this by executing programmable instructions stored in memory 106. Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

Memory 106 represents any form of random access memory (RAM), read-only memory (ROM), flash memory, or the like, or a combination of such devices. Memory 106 includes the main memory of host system 102. Processor 104 may execute machine-implemented instructions 118 for performing certain tasks, as described below in more detail. ROM stores invariant instruction sequences, such as start-up instruction sequences or basic input/output operating system (BIOS) sequences for operation of a keyboard (not shown).

In one embodiment, processor 104 generates an input/output control block (IOCB) 116 that is stored at host memory 106 or at an adapter memory. IOCB 116 provides information regarding a read or write operation. Adapter 114 uses information from the IOCB 116 and generates an I/O request for sending or receiving information.

Also connected to processor 104 through the bus system 108 are one or more internal mass storage devices 110, an adapter interface 112 and other devices and interfaces 120. The other devices and interfaces 120 may include a display device interface, a keyboard interface, and a pointing device interface.

Internal mass storage devices 110 (also referred to as storage 110) may be, or may include any conventional medium for storing data in a non-volatile manner, such as one or more magnetic or optical based disks, flash memory devices, CD-ROMs and others. Storage 110 stores operating system program files, application program files, and other instructions. Some of these files are stored on storage 110 using an installation program.

Host system 102 interfaces with adapter 114 via an adapter interface 112 and a link 124. Adapter 114 may be configured to send and receive information via link 122. In one embodiment, adapter 114 is configured to handle information complying with both network and/or storage protocols. Some common network and storage protocols are described below.

One common network protocol used by adapter 114 may be Ethernet based. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between over 100 Mbps. The description of the various embodiments described herein is based on using Ethernet (which includes 100 Base-T and/or Gigabit, 10 Gigabit, 40 Gigabit, 100 Gigabit Ethernet) as the network protocol. However, the adaptive embodiments disclosed herein are not limited to any particular protocol, as long as the functional goals are met by an existing or later developed network protocol.

Adapter 114 may also use Fibre Channel (also referred to as "FC"), which is a storage protocol used to access storage systems and devices. Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_port" that manages Fabric connections. The N_port establishes a connection to a Fabric element (e.g., a switch) having a fabric port or F_port.

Adapter 114 may also be configured to support Fibre Channel over Ethernet (FCOE) that has been developed to handle both Ethernet and Fibre Channel traffic in a storage area network. This functionality would allow Fibre Channel to leverage Ethernet (for example, 10 Gigabit) networks while preserving the Fibre Channel protocol/links.

"RoCE" (Remote Direct Memory Access (RDMA) over Converged Ethernet) is a network protocol that allows remote direct memory access over an Ethernet network. RoCE is a link layer protocol that allows communication between any two hosts within the same Ethernet broadcast domain. In one embodiment, adapter 114 is configured to support the RoCE protocol.

The iSCSI standard is based on Small Computer Systems Interface ("SCSI"), which enables host computer systems to perform block data input/output ("I/O") operations with a variety of peripheral devices including disk and tape devices, optical storage devices, as well as printers and scanners. A traditional SCSI connection between a host system and peripheral device is through parallel cabling and is limited by distance and device support constraints. For storage applications, iSCSI was developed to take advantage of network architectures based on Fibre Channel and Gigabit Ethernet standards. iSCSI leverages the SCSI protocol over established networked infrastructures and defines the means for enabling block storage applications over transmission control protocol/Internet Protocol (TCP/IP) networks. iSCSI defines mapping of the SCSI protocol with TCP/IP.

Figure 1B:
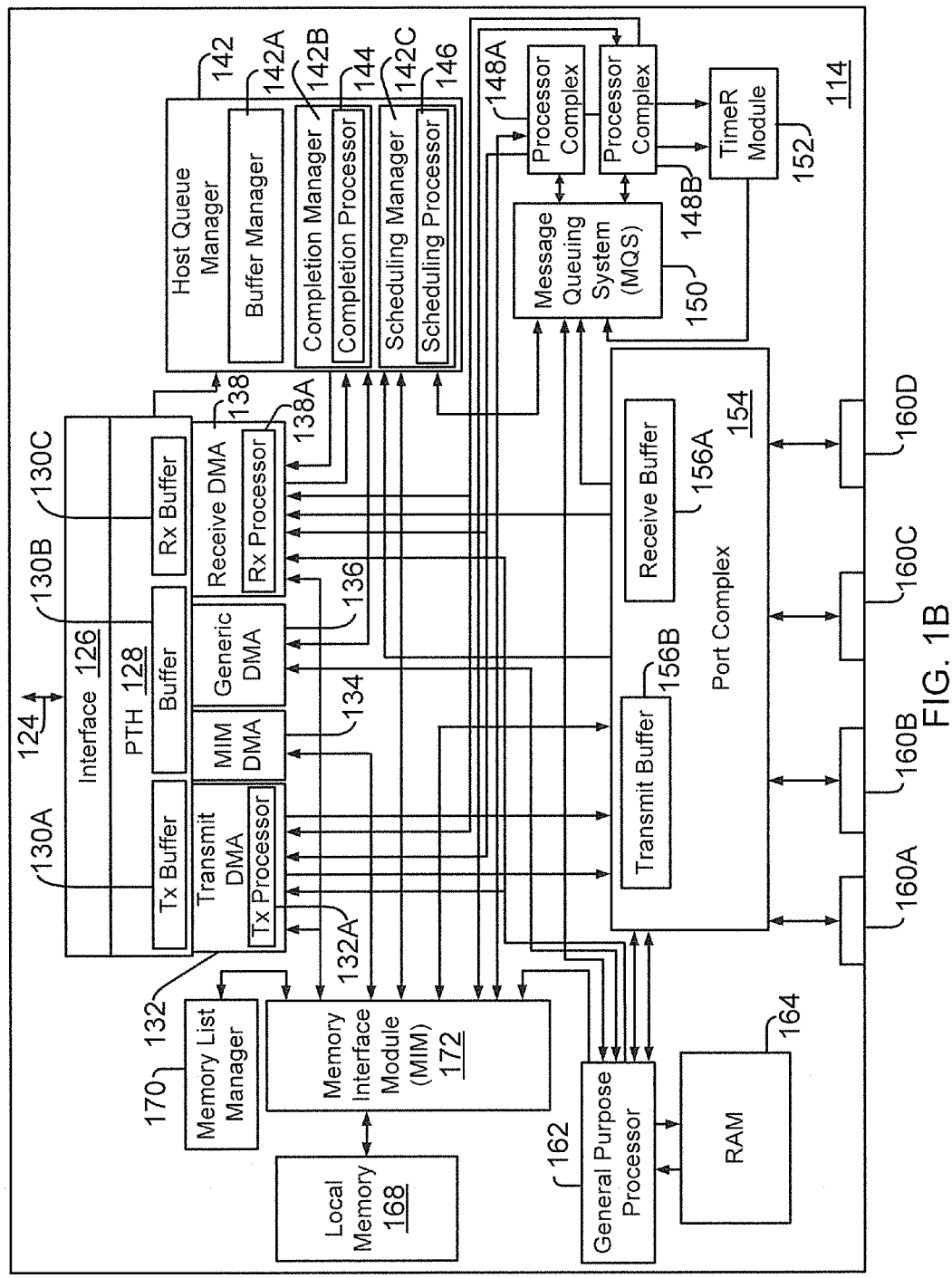
FIG. 1B is a block diagram of an adapter, according to one embodiment.

Adapter 114:

FIG. 1B shows a block diagram of adapter 114, according to one embodiment. Adapter 114 may be configured to process packets complying with a plurality of protocols, including Ethernet, Fibre Channel, RoCE, FCOE, iSCSI and others. The term frame or packet as used herein means information that is sent or received by adapter 114 using one or more protocols/standards.

In one embodiment, adapter 114 may include a plurality of processor complexes 148A-148B and a general-purpose processor 162. Each processor complex 148A-148B may include one or more processors. In another embodiment, adapter 114 may only include a single processor complex with one or more processors. The processor complexes 148A, 148B are configured to perform various functions, for example, processing packets complying with different protocols, including FC, FCoE, RoCE, and/or iSCSI. Processor complexes 148A, 148B interface with a message queuing system ("MQS") 150 that fetches messages for the processor complexes 148A, 148B.

In one embodiment, any processor of a processor complex may be used to process a message complying with any of the protocols. In conventional systems, typically, a dedicated processor/hardware device is used for processing packets complying with different protocols. For example, a FC processor is used to process FC packets, an FCoE processor is used to process FCoE packets and an iSCSI processor is used to process iSCSI packets. Because conventional systems use dedicated processors/hardware devices, they are not very flexible and can become very expensive as the number of protocols continue to increase. Furthermore, the dedicated processor approach can be inefficient from a load balancing perspective, for example, if there are more FCoE packets compared to iSCSI packets, then the iSCSI processor may be idle, while the FCoE processor may be over-utilized. The approach of the adaptive embodiments described herein is to process messages efficiently and then make them available to any of the processors of a processor complex for processing.

The embodiments described herein provide a flexible solution, where a processor from either processor complex 148A-148B may be configured to process any message complying to any of the supported protocols. The MQS 150 efficiently sends messages to the processors and the processors process those messages accordingly. By not using dedicated processors, one is able to better load balance message processing among the processors.

The general-purpose processor 162 (also referred to herein as processor 162) may be used for performing adapter 114 configuration/management related operations as well as for providing information to an external computing system (not shown). Processor 162 has access to a memory module 164 (shown as RAM 164) for storing information.

Adapter 114 includes a memory interface module (MIM) 172 that manages access to local memory 168, host memory 106 or any other external memory by a plurality of clients/modules, for example, processor complex 148A-148B, processor 162, a host queue manager ("HQM") 142, a memory list manager (also referred to as "MLM") 170, a port complex 154 and others. In another embodiment, MIM 172 may control access to local memory 168, the host memory 106 and to any other external memory attached to adapter 144.

Adapter 114 interfaces with host system 102 via an interface 126 and link 124. In one embodiment, link 124 may be a PCI-Express link and interface 126 may be a PCI-Express interface with logic and circuitry to send and receive information packets complying with the PCI-Express standard. Interface 126 includes a sub-module 128 (shown as PTH) having a plurality of locations for temporarily storing information, for example, a transmit side first-in-first-out (FIFO) 130A, a buffer 130B used by the general purpose processor 162 and MIM 172 and a receive side buffer 130C. The transmit side buffer 130A is used to store and reorder packets that are received from host 102 and then transmitted by adapter 114. The receive side buffer 130C stores packets that are received by port complex 154 and then forwarded to host 102.

A plurality of direct memory access (DMA) modules are also provided to access link 124 for sending and receiving information from host 102. For example, a transmit DMA module 132 having a transmit side processor 132A is provided for managing packets on the transmit side, i.e. sent by adapter 114 to other devices. A receive DMA (or Rx DMA) module 138 having a receive side processor 138A is provided to access link 124 for sending information to host 102 received via port complex 154. Details regarding the Rx DMA module 138 are provided below.

A generic DMA module 136 is also provided for enabling communication between general processor 162 and host 102. The generic DMA module 136 may also be used to interface with HQM 142 for providing access to host memory 106. A MIM DMA module 134 is provided so that the MIM 172 is able to interface with host 102 and host memory 106 via link 124.

In one embodiment, HQM 142 coordinates IOCB (input/output control block) and packet movement between host 102 and various modules of adapter 114. HQM 142 may include a buffer manager 142A that manages buffers used for storing packets received from another device; a completion manager 142B uses a completion processor 144 for managing completion notifications received from different modules of adapter 114; and a scheduling manager 142C that uses a scheduling processor 146 for coordinating IOCB movement from the host system 102 and interfacing with MQS 150.

In one embodiment, port complex 154 that is used for sending and receiving information includes a plurality of ports 160A-160D, a receive side (may also be referred to as Rx) buffer 156A and a transmit side (may also be referred to as Tx) buffer 156B. Ports 160A-160D are configured to operate at different rates and/or comply with different protocols, for example, 1G/10G/20G/40G/100G and others. The term rate as used herein means an amount of information that a port can handle within a unit time, for example, a second. Ports 160A-160D may be configured to process packets complying with different protocols, for example, Fibre Channel, Ethernet, RoCE, FCOE and others. The adaptive embodiments described herein are not limited to any particular protocol or transfer rate.

Incoming packets are received by ports 160A-160D and temporarily stored at Rx buffer 156A. Rx DMA module 138 then moves the packets to its proper destination, as described below in detail. On the transmit side, packets are received from host system 102 and then stored at Tx buffer 156B before being transmitted to a destination by one of the ports 160A-160D.

In one embodiment, Rx DMA module 138 is configured to pre-process more than one control block at the same time. Different control blocks may have different process requests and may end-up at different durations. By simultaneously pre-processing more than one control block for DMA operations, adapter 114 does not have to wait to pre-process a control block after a DMA operation ends. The structure and various interfaces for Rx DMA module 138 are described below with respect to FIGS. 1C and 2.

Figure 1C:
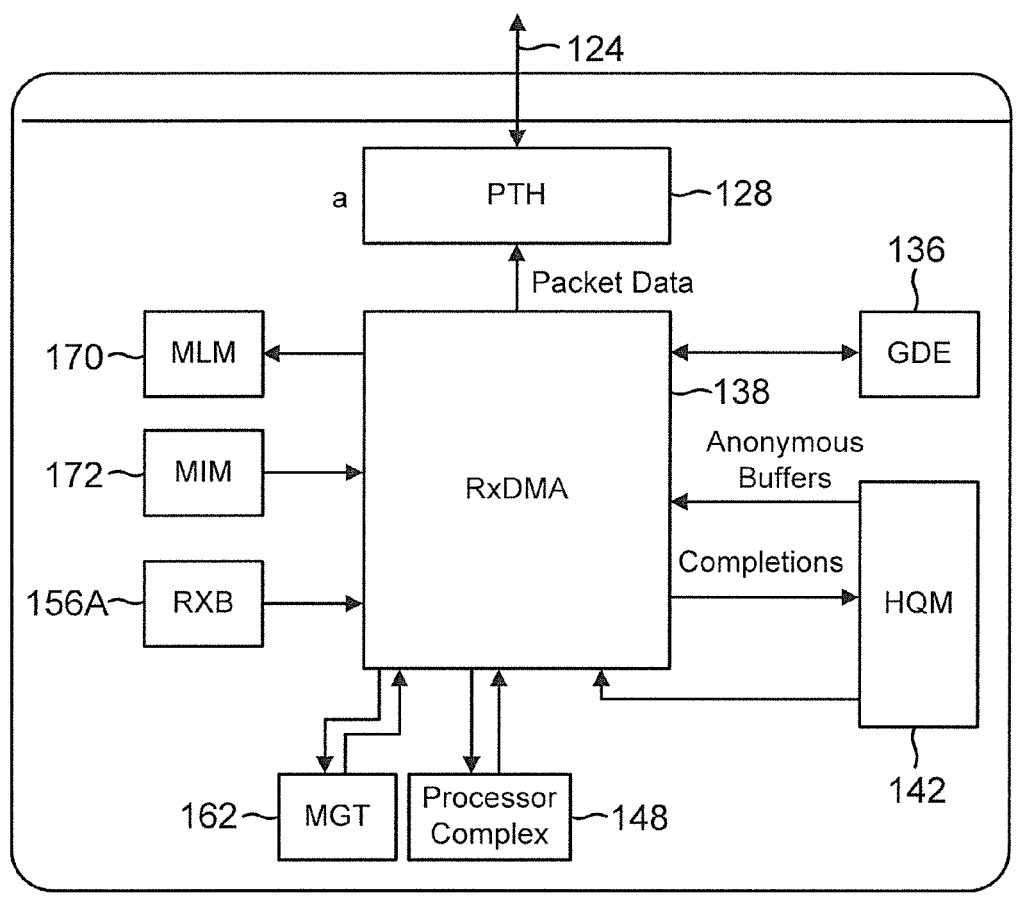
FIG. 1C is a block diagram showing a receive (Rx) direct memory access module interface, according to one embodiment.

Rx DMA Module 138:

FIG. 1C shows a block diagram of Rx DMA module 138 interfacing with various modules, for example, PTH 128, HQM 142, generic DMA engine (GDE) 136, MIM 172 and MLM 170, according to one embodiment.

Rx DMA module 138 receives packets from receive buffer 156A that are then forwarded to host processor via link 124. Rx DMA module 138 also receives packet related information from MIM 172. The information is used to process packets.

Rx DMA module 138 receives anonymous buffer information from HQM 142. The buffers are at host memory 106 and are used to store packets that are DMAed by Rx DMA module 138. Details regarding Rx DMA 138 and its components are provided below with respect to FIG. 2.

In one embodiment, various adapter 114 components generate control blocks for using link 124 to send information to the host processor 104 via DMA operations. In conventional systems, the control blocks requests are pre-processed serially, i.e. after a first control block is pre-processed, another control block is selected and processed. The embodiments disclosed herein pre-process control blocks in parallel, so that when DMA operations for a first control block are completed, the DMA operations for the second control block can be executed immediately.

Figure 2:
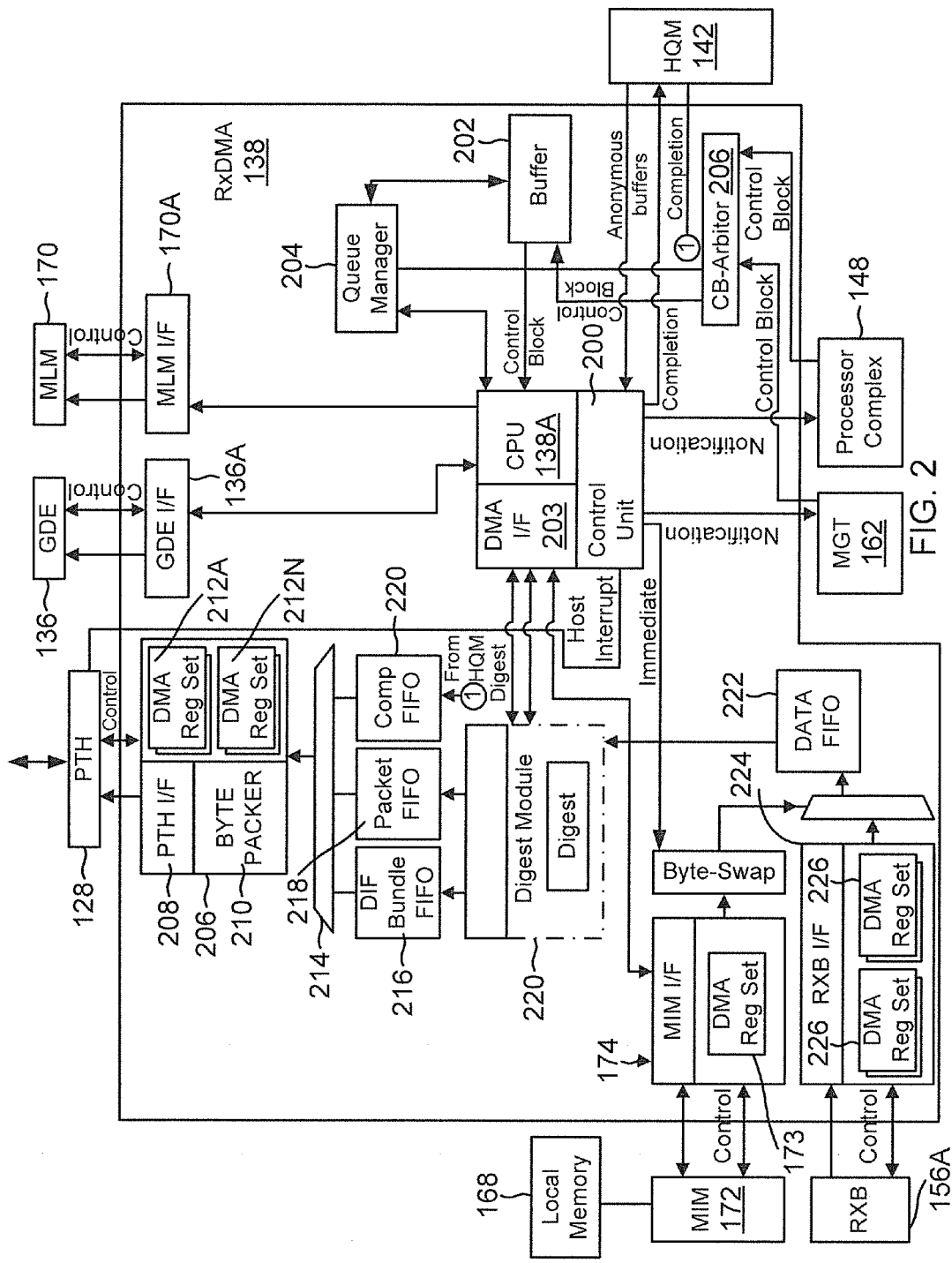
FIG. 2 shows a detailed block diagram of a Rx DMA module, according to one embodiment.

FIG. 2 shows a detailed block diagram of Rx DMA module 138, according to one embodiment. In one embodiment, Rx DMA module 138 includes the processor 138A and a control unit 200 for pre-processing control blocks. In another embodiment, Rx DMA module 138 may just have processor 138A or control unit 200 for pre-processing control blocks. Processor 138A interfaces with GDE 136 and MLM 170 via interface 136A and 170A, respectively, to send and receive control information.

Rx DMA module 138 receives packets from receive buffer 156A or MIM 172 and then forwards the packets to PTH 128 for delivery to host buffers (not shown). Rx DMA module 138 also transfers completion packets from HQM 142. The information regarding data packets at receive buffer 156A and/or MIM 172 is placed in a control block by processor complex 148 or generic processor 162. The Rx DMA module 138 accepts control blocks as they become available and pre-processes them. The following provides a brief description of the various functional blocks of FIG. 2.

Arbiter 206 of Rx DMA module 138 receives control blocks from processor complex 148 and/or processor 162 and moves the control blocks to a buffer 202. Arbiter 206 arbitrates and selects between the control blocks.

Buffer 202 is a memory storage location (for example, a random access memory (RAM)) that is used to store control blocks received from arbiter 206. Buffer 202 may include more than one queue (for example, 8) to store packets for different traffic class and is managed by a queue manager 204. The control blocks may be stored based on a queue number. Queue sizes are configurable and may vary. Buffer 202 also maintains an entry count for each queue to keep track of valid control blocks for a given queue.

Queue manager 204 retrieves control blocks from buffer 202 queues and transfers the control blocks to the control unit 200 for pre-processing. In one embodiment, queue manager 204 may implements a quality of service (QOS) for selecting control blocks from each queue. The queue manager 204 also maintains a control block count for each queue. The count is increased when a control block is added and decreased when a control block is unloaded.

RxB Interface 224 is a DMA interface that is used to fetch packets from Rx buffer 156A and then place them in a data FIFO (first-in-first out) 222. Data FIFO 222 is a temporary memory storage location that operates based on FIFO scheme.

RxB interface 224 includes a plurality registers 226 for storing DMA requests. Control unit 200 with packet addresses configures the registers 224-226. Each request transfers a packet from RxBuffer 156A. As mentioned above, more than one control block can be pre-processed at any given time. Data from data FIFO 222 is provided to a digest module 220 that is described below in detail.

MIM interface 174 is a DMA interface that is used to obtain information (for example, address list control blocks (AL-CBs), digest values and data packets from the local memory 168 managed by MIM 172. Interface 174 includes a DMA register set 173 that may be used to store one or more DMA requests. The information received from MIM 172 is provided to processor 138A for processing via an external dynamic random access memory (DRAM) interface 203.

Rx DMA module 138 includes the digest module 220 that interfaces with the Rx DMA module processor 138A for sending and receiving digest values and information. The digest values are appended to data packets that are received from FIFO 222, before being sent out via PTH 128.

Digests are 4-byte fields appended to the end of an iSCSI PDU, which are a CRC calculation over the data portion of a PDU. iSCSI Header Digests are 4-byte fields appended to the end of a 48-byte iSCSI PDU Header, which are a CRC calculation over the header portion of the PDU. Digests may be based on industry standards, for example, standards specified by the T10 committee of INCITS (International Committee on Information Technology Standards) that is accredited by the American National Standards Institute (ANSI). T10 provides SCSI interface and command set standards. T10 can define digest format and requirements.

Control unit 200 sets up DMA interface to transfer information from RxBuffer 156A/MIM 172 to PTH 128. If a control block needs a digest context block, then the control unit 200 passes part of the control block to CPU 138A to retrieve the digest context block from MIM 172.

Control unit 200 fetches the control blocks from buffer 202, sets up the DMA interface to receive the packet from RxBuffer 156A, sets up the PTH DMA requests and transfers completion to HQM 142. Control unit 200 pre-processes more than one control block at the same time, which reduces any delay due to pre-processing.

PTH DMA module 206 includes a PTH interface 208, a plurality of register sets 212A-212N to store DMA requests and a byte packer 210. The DMA module 206 forwards data packets to PTH 128, selects data from data FIFO 218 and DIF (data integrity field) information from DIF FIFO 216, while completions from HQM 142 are selected from FIFO 220. A multiplexer 214 is used to select from FIFOs 216, 218 and 220, respectively.

DIFs are 8-byte fields appended to each block of data. A DIF contains a Reference Tag, Application Tag, and a CRC value. As DMA occurs, the CRC is determined for each DIF on each data block during a transfer. Depending on packet data, Rx DMA module 138 may need to insert DIFs periodically into the data stream, validate and remove them from the data stream, or validate them and keep them in the data stream.

In one embodiment, more than one control block may be simultaneously setup by control unit 200. For example, assume that DMA register set 212A is assigned to a first control block CB1. CB1 May have 5 DMA requests. A second control block. CB2 that may have 2 requests may be assigned to DMA register set 2 212B. The DMA operation for CB1 will start first using register set 212A. CB2 will be pre-processed and ready at register 212B waiting for the DMA operation to end for CB1. This is efficient because CB2 pre-processing is complete before CB1 DMA operation ends. In conventional systems, CB2 is pre-processed after CB1 DMA operations are complete. Since different control blocks may have different number of DMA requests, the delay in pre-processing CB2 can cause significant performance degradation.

Figure 3A:
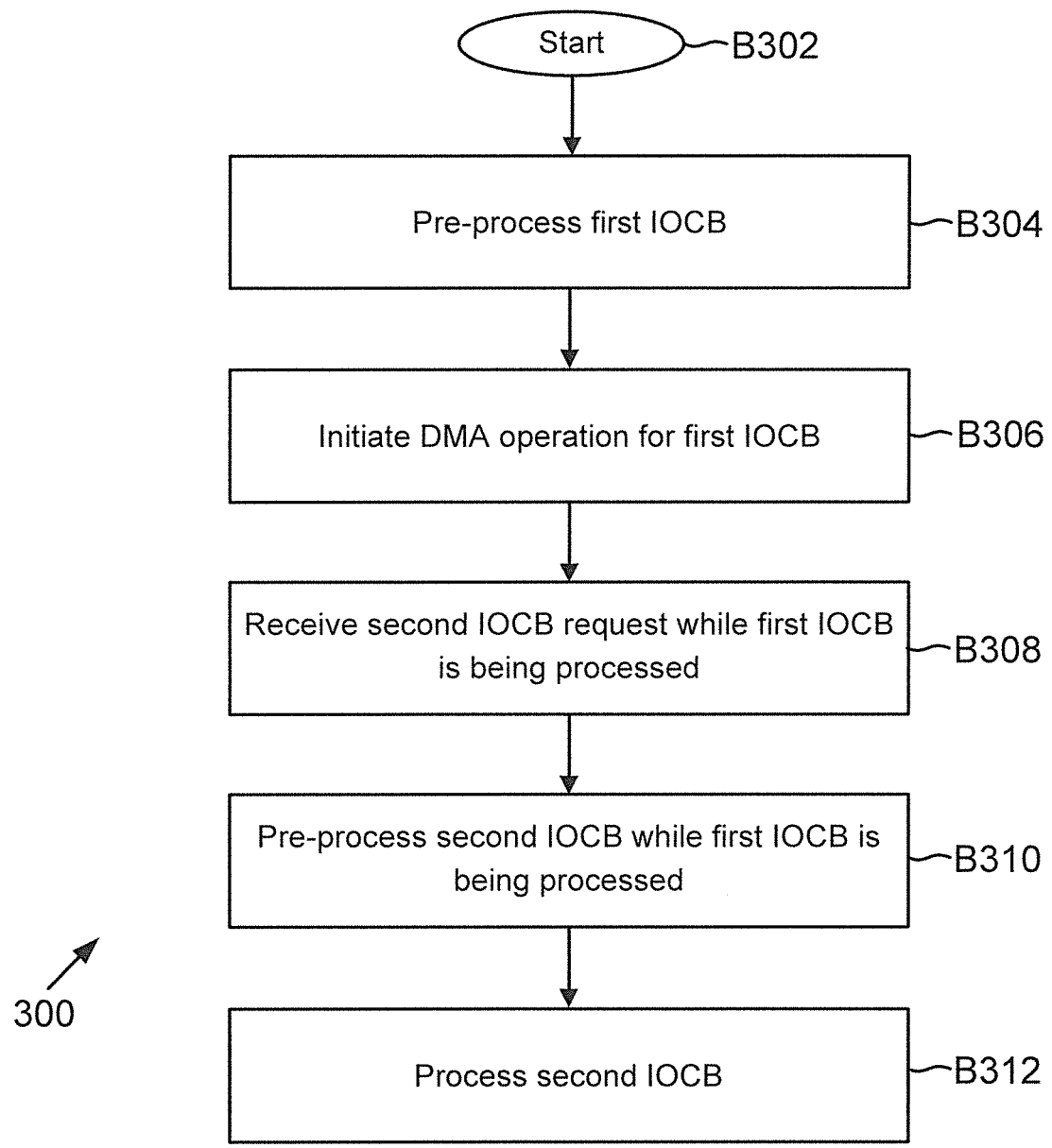
FIG. 3A is a process flow diagram for pre-processing a plurality of control blocks, according to one embodiment.

Process Flows:

FIG. 3 shows a process 300 for simultaneously pre-processing control blocks (or IOCBs), according to one embodiment. Process 300 is used to pre-process more than one control block so that when the DMA operations associated with a first control block are completed, the DMA operations associated with a second control block can begin without any delay. Process 300 maintains in-order processing, while expediting DMA operations, as described below in detail.

The process begins in block B302, when host 102 and adapter 114 are initialized and operational. One or more control block have already been received by adapter 114 and the control block may be to send data to host 102 at an anonymous buffer or at a specific memory location, may be to send a completion response or a notification to processor complex 148/processor 162.

In block B304, the first control block is pre-processed. The DMA operations for the first control block are initiated in block B306. While the first control block is being processed, a second control maybe received in block B308. It is noteworthy that the second and the first control block may be received at the same time or immediately after each other.

In block B310, the second control block is pre-processed while the DMA operations of the first control block are being processed. It is noteworthy that when the first and second control blocks are received at the same time, then the control blocks are pre-processed at the same time. Once the DMA operations for the first control block are completed, the DMA operations for the second control block are already configured. Thereafter, the DMA operations for the second control block are processed in block B312. The nature of pre-processing will depend on the IOCB type, as described below with respect to FIG. 4.

Figure 3B:
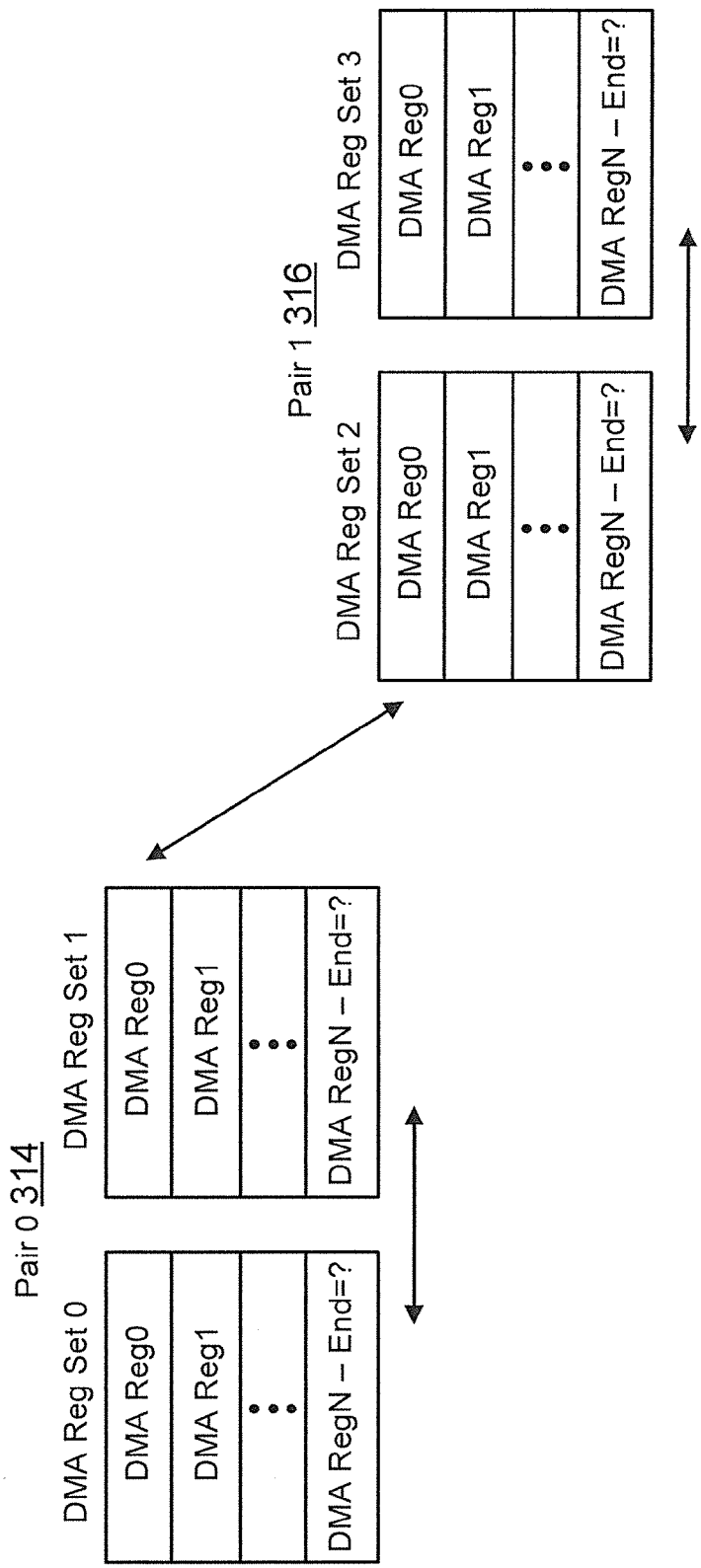
FIG. 3B shows an example of using a plurality of DMA register sets for pre-processing control blocks, according to one embodiment.

An example of using process 300 is shown in FIG. 3B that allows Rx DMA 138 to pre-process more than one control block in parallel. Process 300 may use more than one register set for setting up DMA operations. For example, Pair 0 314 includes a register set 0 and register set 1, while Pair 1 316 includes register sets 2 and 3. Each register set includes a plurality of registers that are used to store DMA requests. The register sets may be located at module 206, described above with respect to FIG. 2.

A control block may have different number of requests and may be assigned to one pair of DMA register sets. For example, assume a control block CB1 includes 5 requests. CB1 is assigned to Register Set 0. A second control block may have 2 requests and is assigned Set 2 of Pair 2 316. The DMA operations involving Set0 start first for in-order delivery. Set 2 is used by CB2, while Set 0 requests are being processed. When CB1 ends, then CB2 is immediately processed from Set2, without any delay. This allows adapter 114 to process multiple control blocks at the same time and maintain in-order delivery.

Figure 4:
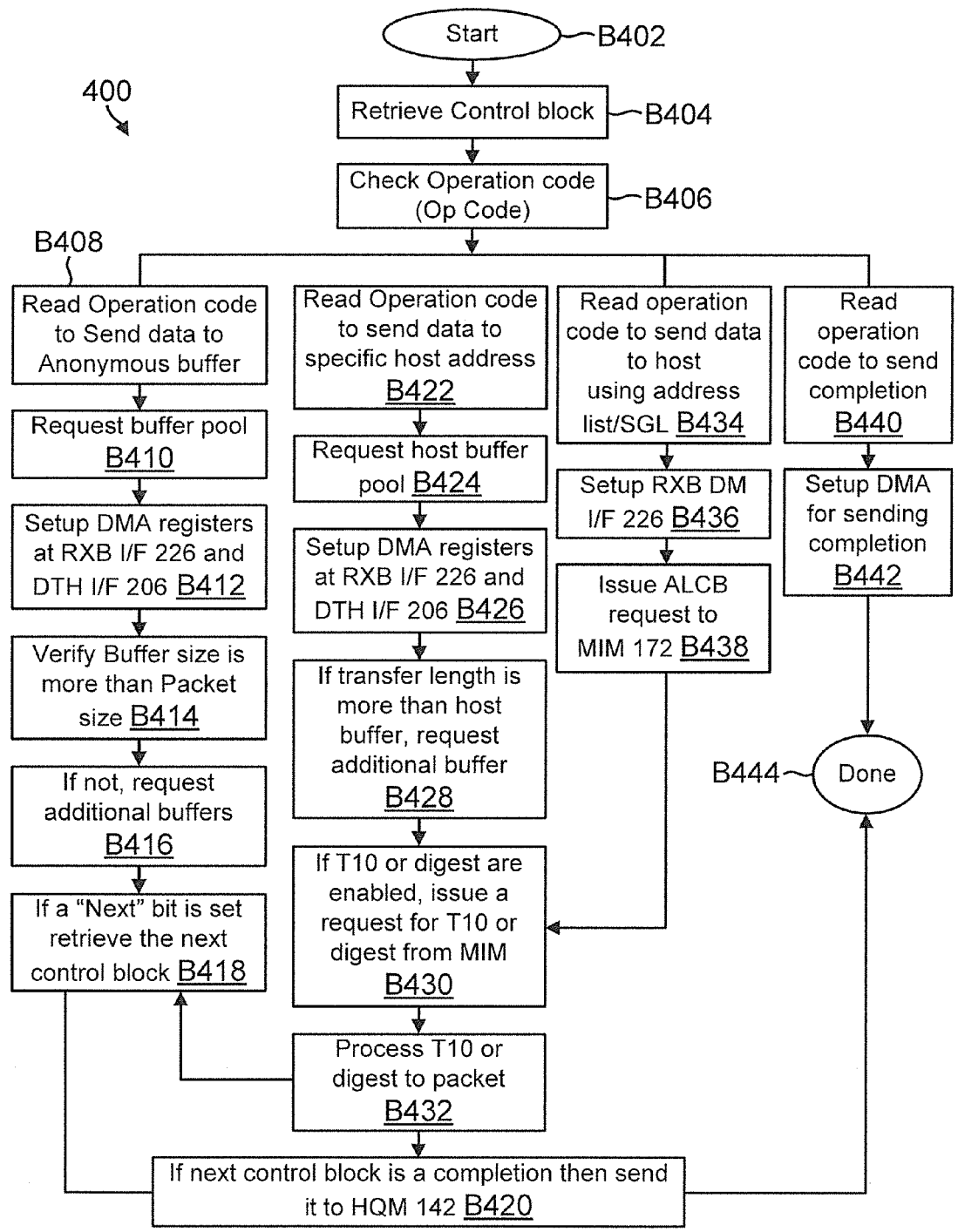
FIG. 4 shows an example of pre-processing control blocks, according to one embodiment.

FIG. 4 shows a process 400 for pre-processing control blocks, according to one embodiment. As described above, the control blocks are pre-processed simultaneously and the DMA requests are generated and configured, such that any delays due to pre-processing are reduced.

The process begins in block B402, after one or more control block has been received and stored at queue 202. The control block is retrieved by control unit 200 in block B404. The control block may include various operation codes, for example, 0x0 indicates to the control unit 200 that the data needs to be sent to one or more anonymous buffers at host memory; 0x1 indicates that data is to be sent to a specific memory address of the host memory; 0x2 indicates to use an address list to send data, 0x3 indicates to use a scatter gather list to send data, 0X4 indicates to send a completion to the host system; 0x5 indicates to send a processor complex 148 notification and 0x6 indicates to send the control block to processor 138A of Rx DMA module 138 and 0x7 may be a reserved code. It is noteworthy that the foregoing operation codes are used as examples and are not intended to limit the adaptive embodiments. The different operation codes require different pre-processing of control blocks.

Blocks B408-B420 illustrate control block pre-processing when data is sent to one or more anonymous buffers. Blocks B422-B432, B418 and B420 illustrate control block pre-processing when data is sent to a specific host address. Blocks B434-B438, B430, B432, B418 and B420 illustrate control block pre-processing when data is sent using an address list and/or a scatter gather list. Blocks B440-B444 illustrate control block pre-processing when a completion is sent. The pre-processing for different operation codes is now described in detail.

In block B408, the control unit 200 reads the operation code from the control block and determines that data has to be sent to one or more anonymous buffer. In block B310, control unit 200 requests a buffer pool from HQM 142. In block B412, the control unit 200 sets up the register sets (for example, 224 and/or 226) at RXB I/F 226 and the register sets (for example, 212A and/or 212B) at module 206. As described above, multiple register set pairs are set up so that data can be moved efficiently and in order.

In block B414, the control unit 200 verifies if the buffer size is greater than the packet size. If not, then in block B416, the control unit 200 requests additional buffers from HQM 142. Thereafter, in block B418, the control unit 200 determines if a "Nxt" bit is set in the control block. The Nxt bit indicates to the control unit 200 that it should retrieve a next control block. If the next control block is a completion message, then in block B420, the buffer pool is appended to the completion message and sent to HQM 142. Thereafter, the pre-processing ends in block B444.

In block B422, control unit 200 determines that the control block is for sending data to a specific host address. In block B424, the control unit 200 requests the host buffer pool identified by the specific address. In block B426, the DMA registers are setup similar to block B412, described above. In block B428, the control unit 200 requests additional buffers from HQM 142, if the transfer length of the request is greater than the available buffer size.

In block B430, the control unit 200 determines if any digest values are needed. If yes, then a request for digest values is generated and issued to MIM 172. The digests are obtained from MIM 172 and then processed in block B432. The processed digest values are appended to the data blocks that are to be transferred and the process then moves to block B418 that is described below.

In block B434, control unit determines that data is to be sent using a scatter gather list or an address list. In block B436, the DMA registers at the RXB Interface 226 are setup. A request to obtain an address list control block (ALCB) is issued to MIM 172. MIM 172 provides the ALCB to the control unit 200. Thereafter, the process moves to block B430.

In block B440, the control unit 200 determines if a completion has to be sent. In block B442, control unit 200 sets up the DMA requests for sending completions and the process ends in block B444.

In one embodiment, a plurality of control blocks is pre-processed simultaneously. The control blocks may be for different operations and may involve different number of DMA requests. Since the DMA registers are setup simultaneously, there is no delay due to pre-processing of control blocks.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
   storing a plurality of control blocks at a memory of a receive module of a device coupled to a computing device, where the control blocks store information regarding data packets stored at a receive buffer accessible to the receive module; wherein the device includes a plurality of processing modules and a memory interface that manages a local memory for storing information regarding the plurality of control blocks;
   retrieving at least a first control block and a second control block from the memory;
   assigning a first direct memory access (DMA) register set to the first control block and a second DMA register set to the second control block;
   simultaneously pre-processing the first control block and the second control block to configure the first DMA register set and the second DMA register set;
   starting a first DMA operation for the first control block, while configuring the second DMA register set; and starting a DMA operation for the second control block, immediately after DMA operations for the first control block are completed;

wherein pre-processing of a control block is based on an operation type and includes:
  determining if data is to be moved to a specific host address, at least one anonymous buffer, or an address list;
  requesting a buffer pool based on the determination; and
  setting up an appropriate register set pair.

2. The method of claim 1, wherein the first control block includes a plurality of DMA requests that are different from a number of DMA requests for the second control block.

3. The method of claim 1, wherein the device is an adapter for processing input/output requests for accessing data stored in a storage area network.

4. The method of claim 1, wherein the pre-processing of the first control block and the second control block is based on a control block type.

5. The method of claim 4, wherein the control block type is to place data at anonymous host memory location.

6. The method of claim 4, wherein the control block type is to send a completion message.

7. The method of claim 4, wherein the control block is for sending data based on an address list.

8. A non-transitory, machine readable storage medium storing executable instructions, which when executed by a machine, causes the machine to perform a method, the method:
  storing a plurality of control blocks at a memory of a receive module of a device coupled to a computing device, where the control blocks store information regarding data packets stored at a receive buffer accessible to the receive module; wherein the device includes a plurality of processing modules and a memory interface that manages a local memory for storing information regarding the plurality of control blocks;
  retrieving at least a first control block and a second control from the memory;
  assigning a first direct memory access (DMA) register set to the first control block and a second (DMA) register set to the second control block;
  simultaneously pre-processing the first control block and the second control block to configure the first DMA register set and the second DMA register set;
  starting a first DMA operation for the first control block, while the second DMA register set is ready for starting a DMA operation for the second control block, immediately after DMA operations for the first control block are completed;
  wherein pre-processing of a control block is based on an operation type and includes:
    determining if data is to be moved to a specific host address, at least one anonymous buffer, or an address list;
    requesting a buffer pool based on the determination; and
    setting up an appropriate register set pair.

9. The storage medium of claim 8, wherein the first control block includes a plurality of DMA requests that are different from a number of DMA requests for the second control block.

10. The storage medium of claim 8, wherein the device is an adapter for processing input/output requests for accessing data stored in a storage area network.

11. The storage medium of claim 8, wherein the pre-processing of the first control block and the second control block is based on a control block type.

12. The storage medium of claim 11, wherein the control block type is to place data at anonymous host memory location.

13. The storage medium of claim 11, wherein the control block type is to send a completion message.

14. The storage medium of claim 11, wherein the control block is for sending data based on an address list.

15. A system, comprising:
  a receive module of a device, executing instructions for:
  storing a plurality of control blocks at a memory, where the control blocks store information regarding data packets stored at a receive buffer accessible to the receive module;
  retrieving at least a first control block and a second control from the memory;
  assigning a first direct memory access (DMA) register set to the first control block and a second (DMA) register set to the second control block;
  simultaneously pre-processing the first control block and the second control block to configure the first DMA register set and the second DMA register set; and
  starting a first DMA operation for the first control block, while the second DMA register set is ready for starting a DMA operation for the second control block, immediately after DMA operations for the first control block are completed;
  wherein pre-processing of a control block is based on an operation type and includes:
    determining if data is to be moved to a specific host address, at least one anonymous buffer, or an address list;
    requesting a buffer pool based on the determination; and
    setting up an appropriate register set pair.

16. The system of claim 15, wherein the first control block includes a plurality of DMA requests that are different from a number of DMA requests for the second control block.

17. The system of claim 15, wherein the device is an adapter for processing input/output requests for accessing data stored in a storage area network.

18. The system of claim 15, wherein the pre-processing of the first control block and the second control block is based on a control block type.

19. The system of claim 18, wherein the control block type is to place data at anonymous host memory location.

20. The system of claim 18, wherein the control block type is to send a completion message.

21. The system of claim 15, wherein the device includes a plurality of processing modules and a memory interface that manages a local memory for storing information regarding the plurality of control blocks.

* * * * *